United States Patent [19]

Kleeman

[11] Patent Number: 4,569,363
[45] Date of Patent: Feb. 11, 1986

[54] TIRE DEFLATION MECHANISM

[76] Inventor: Eugene Kleeman, 17390 Juliana, East Detroit, Mich. 48021

[21] Appl. No.: 669,131

[22] Filed: Nov. 7, 1984

[51] Int. Cl.⁴ ............................................. F16K 15/20
[52] U.S. Cl. .................................... 137/230; 137/233; 152/431
[58] Field of Search ............... 137/223, 231, 230, 232, 137/233, 234.5; 152/DIG. 11, 431, 428, 427

[56] References Cited

U.S. PATENT DOCUMENTS

| 1,232,726 | 7/1917 | Sladden | 152/431 X |
| 1,329,776 | 2/1920 | Kraft | 137/231 |
| 3,315,695 | 4/1967 | Boyer | 137/232 |
| 3,724,488 | 4/1973 | Featherstone | 137/232 X |
| 3,731,718 | 5/1973 | Gramig | 137/233 X |
| 4,338,793 | 7/1982 | O'Hern | 137/231 X |

FOREIGN PATENT DOCUMENTS

| 102970 | 12/1917 | United Kingdom | 137/233 |
| 369648 | 3/1932 | United Kingdom | 137/233 |
| 2031555 | 4/1980 | United Kingdom | 137/233 |

Primary Examiner—Harold W. Weakley
Attorney, Agent, or Firm—Peter A. Taucher; John E. McRae; Robert P. Gibson

[57] ABSTRACT

A hand held mechanism that can be applied to a conventional tire inflation valve on a vehicle tire to facilitate a tire deflation operation. The mechanism includes a rod-like element that automatically engages a tire check valve to open said valve for tire venting purposes. The mechanism also includes a hollow tubular called wall structure adapted to receive the sensing head of a conventional pressure gage, whereby the progress of the tire-deflation operation can be ascertained, as necessary to properly terminate the operation at a desired tire pressure. Mechanisms of the described type can be utilized on all wheels of a multi-wheeled vehicle to permit simultaneously deflation of all vehicle tires, thereby greatly reducing the time required to achieve a total tire deflation operation.

1 Claim, 4 Drawing Figures

TIRE DEFLATION MECHANISM

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to a vehicle tire deflator, i.e., a mechanism attachable to the filler valve of a vehicle tire to facilitate a tire-deflation operation. A somewhat similar mechanism is shown in U.S. patent application, Ser. No. 517,601, filed on July 27, 1983, in the names of Oscar C. Decker and Eugene Kleemann.

Mechanisms of this type are useful when it is desired to move a force of military wheeled vehicles over soft terrain. Preparatory to such an operation the vehicle tires are partially deflated. A partially deflated tire enhances vehicle mobility because it has an enlarged surface area in contact with the terrain so that unit pressure forces (p.s.i.) are relatively small. The tire is less apt to sink into the terrain and thus impede vehicle motion.

Various automatic tire inflation-deflation mechanisms (commonly called central tire inflation systems) have been devised for adjusting or controlling air pressures within vehicle tires. However, such automatic systems are relatively costly to implement into hardware, especially with vehicles having large numbers of tires, e.g., heavy equipment transporters used to transport military tanks or armored Personnel carriers. Additionally such systems add to the weight and complexity of the vehicles. One particular transporter has a total of thirty wheel-tire assemblies, fourteen on the tractor and sixteen on the trailer. An automatic inflation-deflation system for such a vehicle would be relatively costly, heavy, complex and of questionable reliability in adverse climatic conditions (especially arctic conditions).

It is possible to carry out the tire-deflation operation manually, i.e., to manually depress and hold open the tire valve for a length of time, apply a pressure gauge to the valve, and repeat the process until the desired tire pressure is obtained. However, such a process is very time-consuming when the vehicle has a large number of tires, e.g., the previously mentioned heavy equipment transporter. Additionally, when the vehicle has some or all of the wheels arranged as dual wheels (two wheels alongside one another at each end of an axle), it is difficult to maintain prolonged protracted access to valves on the inner tires in a given dual wheel set. The soldier is required to crawl or crouch in the area behind the outer wheel; reading a tire pressure gauge while in a prone or crouched position is time-consuming, difficult and sometimes conducive to reading error.

The present invention is directed to a semi-automatic tire deflation device that can be attached to a tire valve stem (e.g., by screwing it onto the threaded stem area of the valve). The device is provided with a rod-like deflector mechanism that automatically engages the tire check valve to hold it open until the tire has been deflated to a lesser pressure. For example, where the normal tire pressure is sixty p.s.i., the deflation device can be utilized to reduce the pressure to twenty p.s.i. As previously noted, the device is used primarily when it becomes necessary or desirable to appreciably reduce the tire pressure (i.e., increase the terrain contact area) preparatory to vehicle operation in soft soil.

Objects of the invention are to provide a tire deflation mechanism wherein:

1. The mechanism is of very low cost construction, whereby similarly constructed mechanisms can be readily utilized on all wheels of a given vehicle without significantly adding to the vehicle cost.
2. The mechanism has a relatively low mass, whereby said mechanism can be mounted on a vehicle wheel without significantly affecting the rotational balance of the wheel-tire assembly and without requiring additional mounting bracketry.
3. The mechanism is readily graspable by soldiers or other technicians for quick and easy attachment onto a tire valve stem.
4. The mechanism is readily manipulatable by technicians wearing gloves, e.g., in arctic environments.
5. The mechanism includes means thereon permitting the user to apply a standard pressure gauge thereto, whereby the progress of the deflation operation can be readily ascertained, without removing the mechanism from the tire, as necessary to determine when a desired tire pressure is reached.
6. Several mechanisms can be used simultaneously, even with the vehicle in motion, to dramatically reduce the vehicle's total tire deflation time.

PRIOR ART

The closest known prior art device to the present invention is believed to be the device shown in U.S. Pat. No. 1,686,659, issued in the name of R. H. Henemier. The present invention is considered to be an improvement over the Henemier device primarily as regards lower manufacturing cost, greater ease of operation, and greater versatility in usage (principally in regard to a pressure-monitoring capability).

THE DRAWINGS

DETAILED DESCRIPTION OF THE DRAWINGS (FIGS. 1 AND 2)

Figure 1:
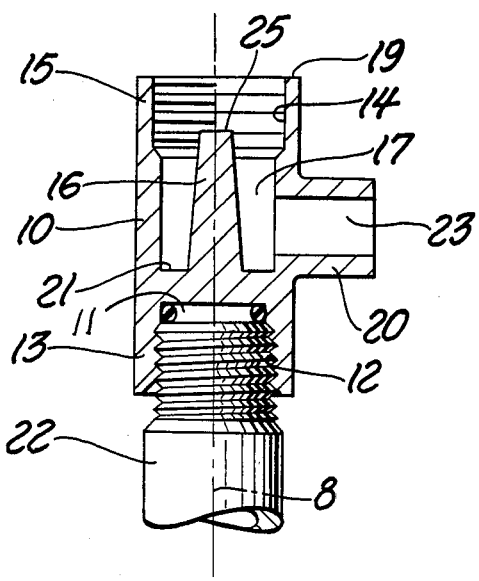
FIG. 1 is a sectional view through one embodiment of the invention.
Figure 2:
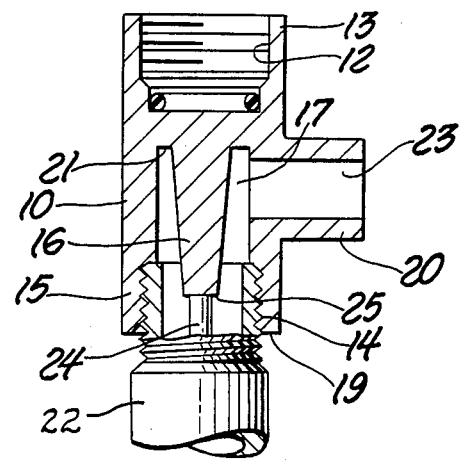
FIG. 2 is a sectional view of the FIG. 1 embodiment, showing same in a different position of adjustment on a tire valve stem.

FIGS. 1 and 2 show a manually operated tire deflator mechanism that includes a housing structure 10 having a cylindrical cavity 11 adapted to fit onto the threaded area of a conventional tire valve stem 22. Cavity 11 defines an annular side wall 13 whose internal surface is threaded, as at 12, whereby housing structure 10 can be manually screwed onto stem 22 by application of a turning force on the main body portion of the housing structure.

The housing structure is of sufficient size to be readily grasped and turned by a technician wearing gloves, as in arctic environments. In a typical situation, the housing structure would have a length (along axis 8 of stem 12) of about one and one half inches, and a diameter of about one half inch. The mass of the housing structure is relatively small, such that it can be retained on the tire stem during the vehicle "travel" mode without significantly affecting the balance of the wheel-tire assembly. A housing structure of the type shown in FIG. 1 is (or may be) used on each wheel of the vehicle.

In its FIG. 1 position, housing structure 10 functions as a dust cap for the associated tire valve stem 22. The housing structure can be reversed end-for-end when it is desired to use the structure as a tire deflation mechanism. FIG. 2 illustrates the housing structure when so used.

A cavity 17 is formed in end surface 19 of the housing structure to define an annular side wall 15. The internal surface of annular wall 15 is threaded, as at 14, to permit the housing structure to be manually screwed onto tire valve stem 22 to the condition shown in FIG. 2. A rod-like projection 16 extends from cavity end wall 21 within the cavity space circumscribed by side wall 15. Projection 16 is spaced radially inward from threaded area 14, whereby the housing structure 10 can be screwed onto tire valve stem 22 without interference from projection 16.

While housing structure 10 is being screwed onto stem 22 the end of the projection contacts conventional check valve 24 within the tire valve stem. During the final stages of the screw-on process, projection 16 exerts a force on check valve 24 to depress same to its open position. The valve-open action occurs incident to the screw-on process without special effort on the part of the technician. While the housing structure is in its fully screwed-on position (FIG. 2), check valve 24 remains open to deflate the associated tire.

The terminal end surface 25 of projection 16 is located inwardly from the general plane of housing end surface 19, such that during the process of screwing the housing structure onto the tire valve stem projection 16 contacts check valve 24 only after the housing structure threads 14 are firmly interengaged with the valve stem threads. It is contemplated that about two complete turns of the housing structure will be required to achieve the desired thread interengagement.

By thus delaying contact between rod-like projection 16 and check valve 24, the screw-on operation can get started without possible interference from valve 25. In this connection, it will be understood that when a tire is fully inflated, there is a considerable axial force on valve 24 tending to bias said valve outwardly along the stem 22 axis. If contact between rod 16 and valve 24 can be delayed while housing structure 10 is just starting to be screwed onto stem 22, there will be a greater assurance of having the threads mesh together in the desired fashion (i.e., without valve 24 exerting undesired force on projection 16).

As noted above, while housing structure 10 is in the FIG. 2 position, the tire will continue to deflate. It is desirable to be able to periodically monitor tire pressure during the course of the operation in order to determine when to discontinue the deflation process, i.e., when the desired pressure is reached. Housing structure 10 includes a tubular wall structure 20 that defines an air outlet chamber 23 in fluid communication with cavity 17. The external diameter of structure 20 is approximately the same as that of stem 22, whereby a conventional tire pressure gauge (not shown) can be manually applied onto structure 20 to achieve a sealed connection therewith.

With the tire gauge manually held on structure 20, the tire pressure is transmitted through chamber 23 into the gauge, thereby producing a deflection of the gauge piston in the usual fashion. The gauge can be applied to structure 20 at any time during the course of the tire deflation process. The pressure monitoring process permits the same final pressure to be achieved in all vehicle tires without appreciable guesswork (as from a mere visual check of tire appearance). The Ppressure monitoring operation is accomplished without disconnecting structure 10 from the tire valve stem.

When the reading on the pressure gauge corresponds to the desired final pressure (e.g. 20 p.s.i.) the deflation process is complete. Structure 10 is then unscrewed from valve stem 22, reversed end-for-end, and screwed back onto stem 22 to the FIG. 1 standby condition ready for later use, as necessary.

In a typical vehicle having a large number of wheels the tires can be deflated more or less simultaneously, but in some predetermined order. Thus, structures 10 for the respective wheels can be sequentially unscrewed from their respective stems 22, and screwed down to the FIG. 2 positions. When the first tire is deflated to the desired extent the housing structure 10 for that tire can be removed and screwed back to the FIG. 1 condition; similar operations can be performed on the other structures 10 in the same order as previously performed to initiate successive tire deflation operations.

Tire deflation operations can be performed more-or-less simultaneously on a large number of tires. Depending on the volumetric capacities of the tires, time to deflate a set of tires would be on the order of ten minutes. The vehicle can be in motion during the deflation process (except during periods when structures 10 are being screwed/unscrewed or when pressure readings are being taken).

Figure 3:
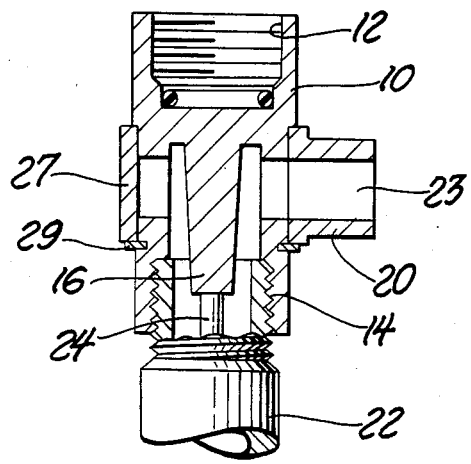
FIG. 3 is a sectional view of a second embodiment of the invention.

FIG. 3 illustrates a structure that is similar to the structure of FIGS. 1 and 2, except that tubular wall structure 20 has a swivel connection with other portions of housing structure 10. In this case, wall structure 20 is carried by a sleeve 27 that can rotate or swivel on the main body portion of housing structure 10. Retainer ring 29 keeps sleeve 27 from sliding off the housing structure. The purpose of the described swivel connection is to permit tubular structure 20 to take any of various different angular orientations when the housing structure is screwed onto the tire valve stem. The aim is to orient structure 20 so that it projects directly away from the vehicle wheel, such that a pressure gauge can be more easily (readily) applied thereto.

Figure 4:
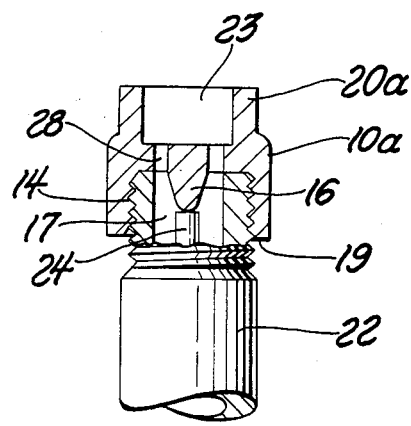
FIG. 4 is a sectional view of a third embodiment of the invention.

The mechanisms shown in FIGS. 1 through 3 are intended to be carried on the vehicle wheel(s) during the travel mode (FIG. 1 position). FIG. 4 illustrates a variant of the invention designed to be stored off the wheel when not needed for tire deflation purposes. The FIG. 4 structure is functionally similar to the structures of FIGS. 1 through 3; however, tubular wall structure 20a is in this case axially aligned with cavity 17 (rather than being at right angles thereto as in the other embodiments of the invention). Chamber 23 and cavity 17 communicate with one another via a number of holes or passages 28.

The desired mechanisms of FIGS. 1 through 4 are somewhat similar to a mechanism shown in U.S. Pat. No. 1,686,659, issued to R. H. Henemier. However, the Henemier mechanism has no pressure-monitoring capability. Also, the Henemier mechanism is believed to have greater parts complexity than the mechanisms proposed herein.

The Henemier device requires a special valve stem, with internal threads all the way to its entrance opening. On modern valve stems the internal threads start approximately one eighth inch down, with only a clearance hole for insertion of the valve stem core. The Henemier valve cap D could probably not be used on modern tire valve stems.

It is also noted that the Henemier mechanism includes an operating component N that is partially obstructed by a cap member D; it is believed that operation-manipulation of the Henemier mechanism would prove difficult, especially by a person wearing gloves.

I wish it to be understood that I do not desire to be limited to the exact details of construction shown and described for obvious modifications will occur to a person skilled in the art, without departing from the spirit and scope of the appended claims.

What is claimed is:

1. In combination with a vehicle tire valve that includes an externally threaded hollow stem (22) and a depressible check valve (24) therewithin: the improvement comprising manually-operated means for deflating the tire to a predetermined value for enhanced soft-soil mobility, and measuring the tire pressure during the course of the deflation process;

said manually-operated means comprising a one piece hollow housing structure (10) having an external end surface (19); said send surface having a cavity (17) formed therein, said cavity defining an internal cavity end surface (21) and internal annular cylindrical side surface; said annular side surface having threads (14) formed thereon; said threads being sized to interfit with the external threads on the aforementioned tire valve stem, whereby the housing structure can be mounted on the valve stem by a manual screw-on process;

a rod-like element (16) extending within the space circumscribed by the cavity side surface; said rod-like element being spaced radially inwardly from the cavity side surface, whereby the housing structure can be screwed onto the tire valve stem without interference from the rod-like element; the rod-like element being of such a length that during the process of screwing the housing structures onto the valve stem, said element contacts the aforementioned check valve and moves same to an open position, whereupon the tire undergoes a deflation process; said rod-like element terminating inwardly from the plane of the housing structure end surface (19) so that during the process of screwing the housing structure onto the tire valve stem the rod-like element contacts the check valve only after the housing structure threads are firmly interengaged with the valve stem threads;

said hollow housing structure including a tubular wall structure (20) that defines an air outlet chamber (23) in fluid flow communication with the aforementioned cavity; the tubular wall structure having an external diametrical dimension approximately the same as that of the tire valve stem, whereby a tire pressure gauge can be manually inserted onto the tubular wall structure to achieve a sealed connection therewith; the tubular wall structure constituting a mechanism for transmitting the tire pressure into the gauge while the housing structure is in position on the tire valve; said tubular wall structure extending at right angles to the aforementioned cavity and associated rod-like element, whereby said wall structure (20) is readily accessible to a pressure gauge when the rod-like element has contact with the aforementioned check valve;

said housing structure having a second external end surface oriented parallel to the aforementioned end surface (19); said second end surface having a second cylindrical cavity (11) therein defining a second internal annular side surface formed with threads (12) thereon; said second mentioned threads being sized to interfit with the external threads on the aforementioned tire valve stem, whereby the housing structure can be screwed onto the valve stem preparatory to operation of the vehicle in its travel mode; the aforementioned cavities being unconnected whereby the housing structure constitutes a dust cap for the hollow valve stem when the second mentioned threads are interengaged with the valve stem threads;

the aforementioned cavities being in axial alignment with one another, whereby the housing structure is reversed end-for-end in order to switch between the deflation mode and vehicle travel mode.

* * * * *